D. A. SANBORN.
PENMAN'S HAND SUPPORT.
No. 105,001.    Patented July 5, 1870.
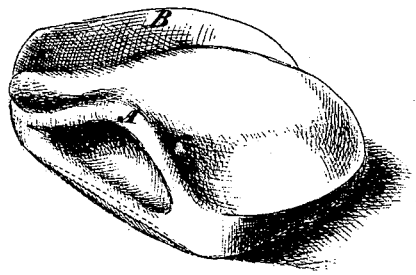
Witnesses:    Inventor:
Gustave Dieterich    D. A. Sanborn
Alex. F. Roberts    Per Munn & Co.
    Attorneys.

DANIEL A. SANBORN, OF BROOKLYN, NEW YORK.

Letters Patent No. 105,001, dated July 5, 1870; antedated June 30, 1870.

IMPROVEMENT IN PENMAN'S HAND-SUPPORTS.

The Schedule referred to in these Letters Patent and making part of the same

*To all whom it may concern:*

Be it known that I, DANIEL A. SANBORN, of Brooklyn, Kings county, and State of New York, have invented a new and improved Hand-Support; and I do hereby declare that the following is a full, clear, and exact description thereof, which will enable others skilled in the art to make and use the same, reference being had to the accompanying drawing forming part of this specification.

The present invention relates to a new and useful device for supporting and forming a rest for the hand while writing or drawing, and is also intended to be used in schools for the purpose of training or teaching persons to hold their pens in a proper position, the construction and operation of which will be fully understood from the following description.

The accompanying drawing represents a perspective view of my device.

This hand-support or rest is to be made of any light material capable of obtaining a high polish, such as vulcanized rubber, *papier-maché*, &c., the same being so shaped as to conform to the shape of the folded hand in the position properly taken by a good penman, thus giving a good permanent set for beginners, or those who have by carelessness allowed themselves to write in an awkward position.

In order to use my device, first grasp the lip A with the third and fourth fingers. This lip being raised, as shown, will form a bridge or support for the palm of the hand, while the edge or side of the hand bears against the raised ledge B, and thus serves to steady the hand, and enables the same to be moved from side to side with ease.

The base or bottom of this device is made either slightly convex or concave, so as to present as little bearing-surface as possible.

Having thus described my invention,

I claim as new and desire to secure by Letters Patent—

An improved chirographical supporter, having a projecting lip, A, to support the palm of the hand, and the raised ledge B, to form a rest for the edge thereof, each being constructed and adapted for use in the manner specified.

The above specification of my invention signed by me this 9th day of November, 1869.

D. A. SANBORN.

Witnesses:
 GEO. W. MABEE,
 CHARLES H. NASH.